No. 719,157. PATENTED JAN. 27, 1903.
E. S. STAPLES.
NUT LOCK.
APPLICATION FILED DEC. 21, 1901.
NO MODEL.

WITNESSES
Frank S. Dewire
May F. Ritchie

INVENTOR,
Elisha S. Staples,
BY his ATTORNEY,
Frank F. Allen.

THE NORRIS PETERS CO., PHOTO-LITHO., WASHINGTON, D. C.

UNITED STATES PATENT OFFICE.

ELISHA S. STAPLES, OF HARTFORD, CONNECTICUT.

NUT-LOCK.

SPECIFICATION forming part of Letters Patent No. 719,157, dated January 27, 1903.

Application filed December 21, 1901. Serial No. 86,851. (No model.)

*To all whom it may concern:*

Be it known that I, ELISHA S. STAPLES, a citizen of the United States, residing at Hartford, in the county of Hartford and State of Connecticut, have invented certain new and useful Improvements in Nut-Locks, of which the following is a full, clear, and exact description.

This invention seeks to provide a cheap and serviceable nut-lock that may be used with bolts and nuts as ordinarily constructed and which may be readily operated to lock or unlock a nut a great number of times and without destroying the bolt.

Figure 1:
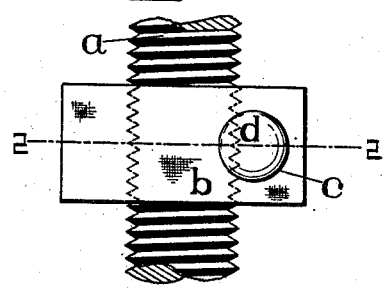
Figure 2:
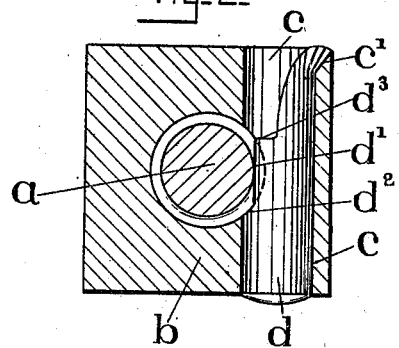
Figure 3:
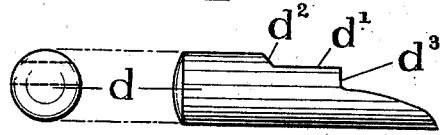
Figure 4:
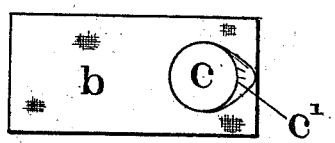

To assist in explaining my invention, the accompanying drawings have been provided, which serve to illustrate the same as follows:

Figure 1 is a side view of a bolt and nut fitted up with my new device. Fig. 2 is a cross-sectional view taken on the line 2 2 of Fig. 1. Fig. 3 embraces end and side views of a certain plug by means of which the locking of the nut is attained. Fig. 4 is an elevation showing the opposite side of the nut of Fig. 1.

In the drawings the letter $a$ indicates a bolt of ordinary construction, and $b$ a threaded nut adapted to be screwed upon the correspondingly-threaded body of the bolt. The nut $b$ is drilled through from side to side in such manner as to cut into the central threaded opening in the nut, as best shown in the Fig. 2, the hole thus provided being denoted by the reference-letter $c$ and being adapted to receive the locking-plug of my device.

The locking-plug is denoted as a whole by the reference-letter $d$ and is round in cross-section and of such diameter as to be a reasonably-tight fit in the hole $c$. Substantially midway its length—that is to say, directly opposite the threaded opening in the nut when the plug is in position therein—the said plug is flattened or cut away, as at $d'$, in such manner as to provide two shoulders $d^2$ $d^3$, the latter of which is of such an angle to the axial center of the plug $d$ as to form a cutting edge.

At one end of the hole $c$ the circular wall of the same is notched, as at $c'$, (best shown in Fig. 4,) for a purpose to be explained.

After the nut $b$ has been screwed home to its desired position on the bolt $a$ the plug $d$ is inserted in the said nut, the smaller (cut-away) end of the plug being introduced into the unnotched end of the hole $c$. The position of the plug $d$ in the hole $c$ should be such that the shoulder $d^3$ of the said plug will engage the threaded bolt $a$, and when the plug $d$ is driven forward the said shoulder operates to cut off the engaged portion of the thread of the bolt. The driving of the plug is continued until the shoulder $d^2$ is brought into engagement with the bolt $a$ to limit any further entrance of the plug, which engagement occurs substantially simultaneously with the seating of the plug in the nut. When the plug $d$ is seated in the nut $b$, its flattened portion $d'$ engages that portion of the bolt $a$ from which the thread has been cut by the shoulder $d^3$, thus preventing the rotation of the nut upon the bolt and positively locking the said bolt and nut together, as shown in Fig. 2. To guard against the accidental displacement of the plug $d$, as well as all possibility of its rotation within the nut, the end of the said plug adjacent the notch $c'$ is clenched over and caused to enter the said notch, as also shown in Fig. 2.

Whenever it is desired to remove the nut from the bolt, it is only necessary to pry the clenched end of the plug $d$ from its seat in the notch $c'$, after which the plug may be driven from the nut, thus withdrawing the flattened portion $d'$ of the said plug from engagement with the bolt-threads. The nut may then be removed from or adjusted upon the bolt to tighten it, for I find in practice that the slight mutilation of the bolt-threads does not hinder to any appreciable extent the rotation of the nut.

Particular attention should be given to the fact that the plugs $d$ may be readily and cheaply made from ordinary bars of round steel by simply milling off the flattened side of the plug, also that a straight round hole only is required to be provided in the nut, the described construction being more cheaply and practically produced than the corresponding parts of similar devices in which square or dovetailed plugs are used.

My described device may be cheaply produced, is positive in its action, and may be applied to bolts and nuts as most commonly manufactured at this time.

Having thus described my invention, I claim—

1. In combination with a threaded bolt, and a nut screwed thereon, a locking-plug mounted in the nut and provided with a transverse angular shoulder adapted to cut away the bolt-threads as the said plug is driven into the nut, and also with a second shoulder in the rear of the said cutting-shoulder adapted to limit the entrance of the plug into the nut, substantially as described.

2. In combination with a threaded bolt, a nut screwed thereon, the said nut being formed with a hole $c$ and notch $c'$, a locking-plug mounted in said hole, said plug being formed with a transverse angular shoulder to cut into the bolt-threads, and a second shoulder $d^2$ to limit the entrance of the plug into the nut and having also a projecting end adapted to be clenched into the said notch $c'$ to prevent the withdrawal and rotation of the said plug.

3. In combination, a threaded bolt, a nut screwed thereon, and a non-tapering locking-plug seated in said nut; said plug being round in cross-section and formed with transverse shoulders $d'$ $d^2$, and means for preventing the accidental withdrawal of said plug.

4. In combination, a threaded bolt, a nut screwed thereon, and a round non-tapering locking-plug seated in said nut, said plug being formed with transverse shoulders $d^2$ $d^3$, and means for preventing the withdrawal and rotation of said plug consisting of a notch $c'$ in the nut and the engaging clenched end of the plug, all substantially as specified.

Signed at Hartford, Connecticut.

ELISHA S. STAPLES.

Witnesses:
JOHN W. ROSE,
FRANK D. ELLIAR.